March 31, 1959  G. W. CORNELIUS  2,880,079
EXHAUST GAS PURIFYING APPARATUS
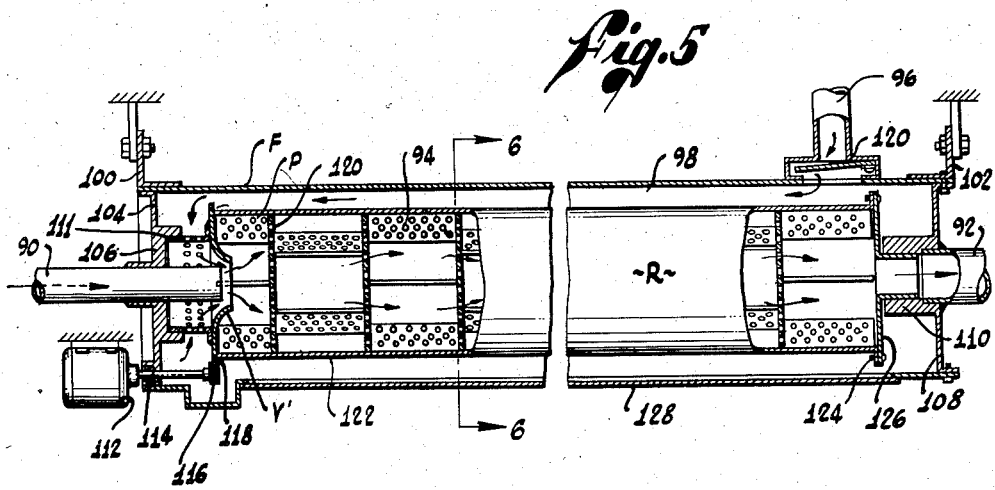
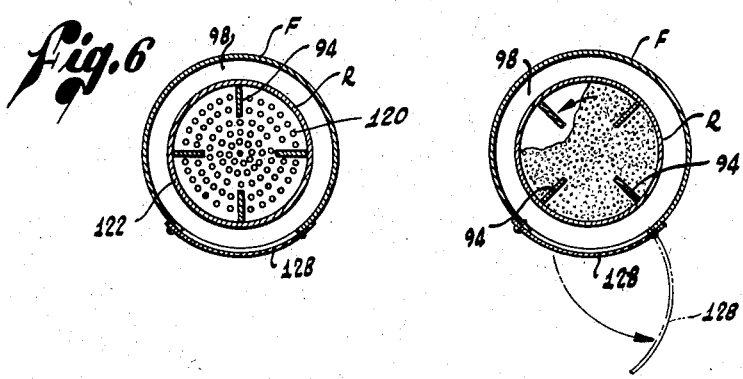
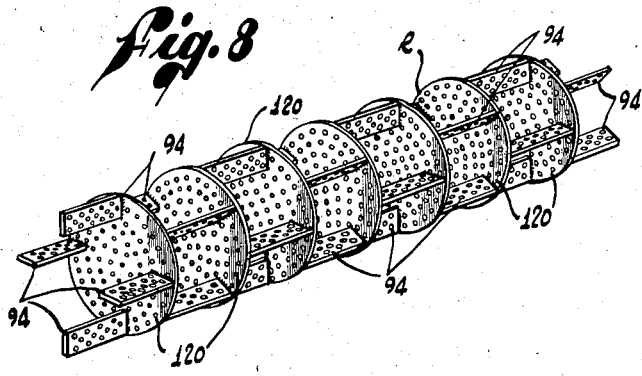
INVENTOR.
GEORGE W. CORNELIUS
BY
ATTORNEYS

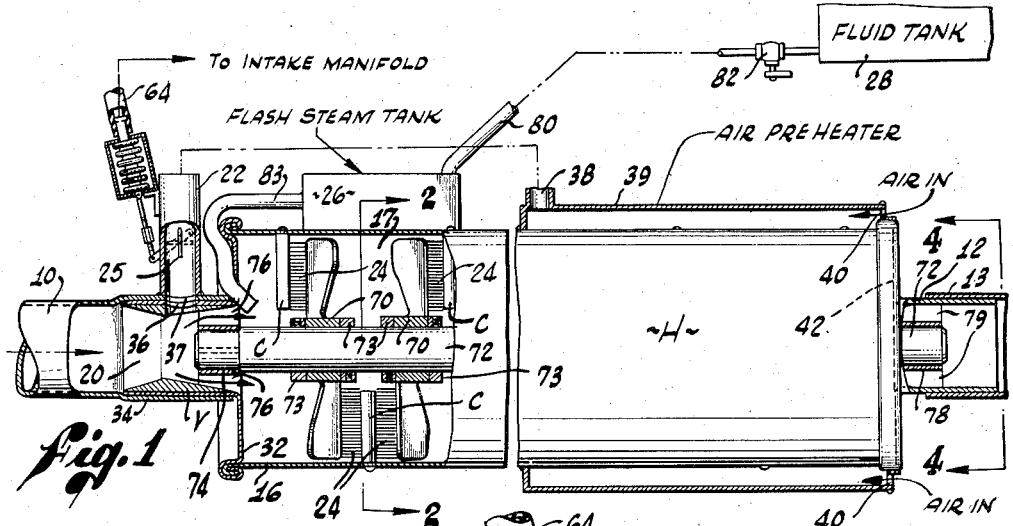
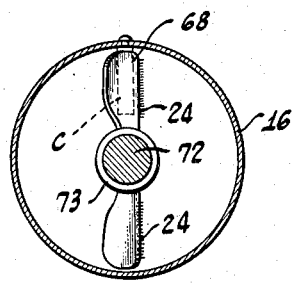
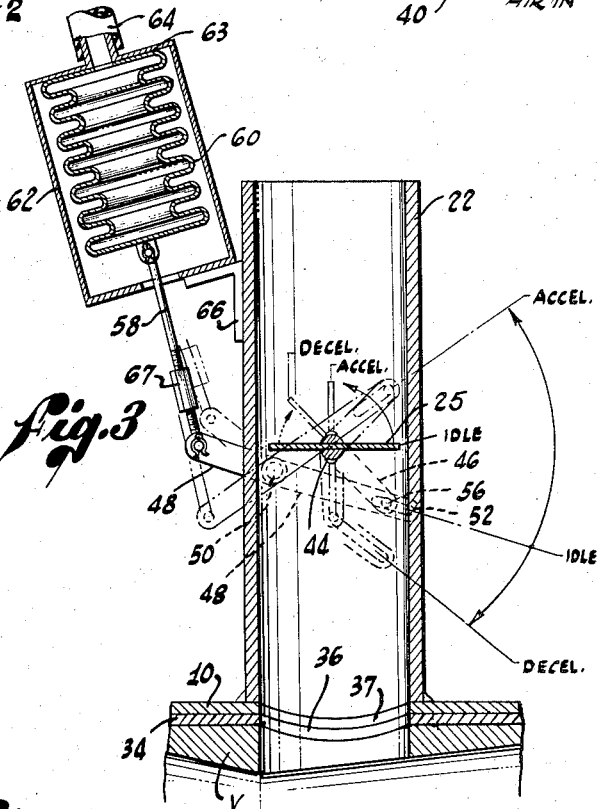
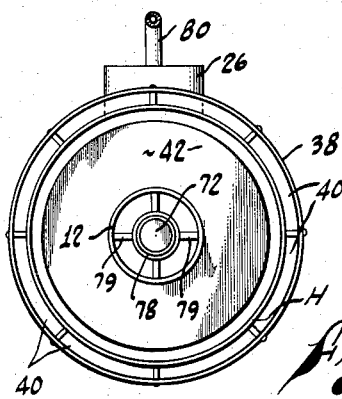

United States Patent Office 2,880,079
Patented Mar. 31, 1959

2,880,079

EXHAUST GAS PURIFYING APPARATUS

George W. Cornelius, Portuguese Bend, Calif., assignor to Holley Carburetor Company, Van Dyke, Mich.

Application June 11, 1956, Serial No. 590,739

6 Claims. (Cl. 23—288)

The present invention relates generally to the field of internal combustion engines and more particularly to a novel apparatus for purifying the unburned products of combustion exhausted from an internal combustion engine.

It is well known that the unburned products of combustion exhausted from the internal combustion engines of automotive vehicles constitute a prime source of the so-called "smog" which exists in and around the principal population centers of the country. The harmful effects of this smog upon both animate and inanimate objects are likewise very well known. Although many forms of apparatus for consuming these unburned products of combustion have been heretofore-proposed, such devices have for various reasons proven to be unsatisfactory and accordingly are not now in general usage.

It is a major object of the present invention to provide an effective apparatus for purifying the unburned products of combustion exhausted from an internal combustion engine.

Another object is to provide exhaust gas purifying apparatus of the catalytic afterburner type. With the heretofore-proposed catalytic afterburners, the catalyst becomes coated with carbon, lead and other foreign materials contained in the exhaust gas after a relatively short period of operation. When this occurs, the efficiency of the catalytic afterburner is considerably reduced, especially where highly leaded fuel is employed.

It is an important object of the present invention to provide a catalytic afterburner having novel means for preventing the coating of the catalyst whereby the efficiency of the device remains high over long periods of engine operation.

Another object is to provide a catalytic afterburner of the aforedescribed nature which incorporates both mechanical and chemical scrubbing means for the catalyst.

A further object is to provide a catalytic afterburner that is comparatively simple in design and rugged of construction whereby it may afford a long and trouble-free service life.

It is a further object of the invention to provide apparatus of the aforedescribed nature which may be readily installed upon the engine of any conventional automotive vehicle.

A further object is to provide a catalytic afterburner which is fool-proof and automatic in operation.

An additional object is to provide a catalytic afterburner having means for automatically controlling the amount of fresh air admitted to the burning chamber in accordance with the operating conditions of the engine with which it is employed.

These and other objects and advantages of the present invention will become more apparent from the following detailed description, when taken in conjunction with the appended drawings, wherein:

Figure 1 is a side elevational view, taken partly in central vertical section, showing a first form of catalytic afterburner embodying the present invention;

Figure 2 is a vertical sectional view taken on line 2—2 of Figure 1;

Figure 3 is an enlarged central vertical sectional view of a control valve utilized with said afterburner apparatus; and Figure 4 is a rear elevational view taken on line 4—4 of Figure 1.

Referring to the drawings, a preferred form of catalytic afterburner apparatus embodying the present invention includes a generally cylindrical housing H having its front end in communication with the exhaust pipe 10 of the internal combustion engine (not shown) of an automotive vehicle, and having its rear end formed with a tube 12 adapted to be connected to a tailpipe 13. A plurality of radially extending rods of catalytic material C are secured to the side walls 16 of the housing H at axially spaced points therealong. The interior of the housing H defines an oxidation or burning chamber 17 for engine exhaust gases entering through the exhaust pipe 12. A venturi tube V is disposed forwardly of the housing H. The throat 20 of this venturi V is in communication with a fresh air inlet tube 22. A control valve 25 is provided in the inlet tube 22 for automatically regulating the amount of fresh air introduced into the front of the housing H, in a manner to be described hereinafter. A plurality of brushes 24 are rotatably mounted within the housing H for mechanically scrubbing the catalyst rods C. The catalyst rods C may consist of platinum, nickel or other substance commonly employed in catalytic afterburners. A flash steam tank 26 is secured to one side of the housing H and has its rear end connected with a fluid tank 28 and its front end in communication with the interior of the housing H. This arrangement permits the catalyst rods C to be scrubbed chemically in a manner to be fully set forth hereinafter.

More particularly, the housing H is of cylindrical configuration and its front wall 32 is formed with a forwardly extending neck 34 wherein is disposed the venturi tube V. The rear portion of the exhaust pipe 10 is of expanded diameter so as to telescopically encompass the neck 34. The neck 34 and the exhaust pipe 10 are formed with vertically aligned bores 36 and 37, respectively, which bores are aligned with the upstanding inlet tube 22. The upper end of the inlet tube 22 is in communication with the front end of a cylindrical air pre-heater jacket 39 by a length of tubing 38. The pre-heater jacket 39 coaxially encompasses the rear portion of the housing H. Air inlets 40 are defined between the rear ends of the housing H and the jacket 39. The rear wall 42 of the housing H is rigidly affixed as by welding to the front end of the tailpipe tube 12.

The control valve 25 is of the butterfly type and is supported for pivotal movement within the inlet tube 22 by a horizontal shaft 44, as shown in Figure 3. With further reference to this figure, a crank arm 46 is keyed to the horizontal shaft 44 exteriorly of the inlet tube 22. An elongated operating lever 48 is pivotally secured by a pin 50 to the inlet tube 22 adjacent the shaft 44. One end of this operating lever 48 is formed with a slot 52 that slidably receives a pin 56 formed on the free end of the crank rod 46. The opposite end of the lever 48 is pivotally affixed to the lower end of an elongated rod 58. The upper end of this rod 58 is pivotally affixed to the lower or free end of a metallic control bellows 60 disposed within a cylindrical housing 62 and having its upper end rigidly affixed to the upper wall 63 thereof. The interior of the control bellows 60 is in communication with the intake manifold of the internal combustion engine by means of a conduit 64. The lower end of the housing 62 is rigidly affixed to one side of the inlet tube 22 by means of a bracket 66. A turnbuckle 67 is interposed between the lower end of the rod 58 and the free end of the operating lever 48.

Each of the brushes 24 are affixed to a propeller-like blade 68 having its radially inner end secured to a hub 70. As shown in Figure 2, a pair of blades 68 are secured to each of the hubs 70. The hubs 70 are journaled at axially spaced points along a shaft 72 between pairs of keeper rings 73. The front end of the shaft 72 is mounted within a front collar 74 coaxially maintained within the neck 34 by radially extending struts 76. The rear end of this shaft is mounted within a rear collar 78 coaxially maintained within the front end of the tailpipe tube 12 by radially extending struts 79.

As shown in Figure 1, the fluid tank 28 is connected to the flash steam tank 26 by a transfer conduit 80. A manually operated shut-off valve 82 is interposed in this transfer conduit 80. An inlet conduit 83 extends from the front of the flash stream tank 26 through a bore formed in the front wall 32 into the front portion of the housing's interior. The fluid tank 28 contains oxygen or other suitable fluid which will be effective in chemically scrubbing the surface of the catalyst rods C.

In the operation of the aforedescribed form of catalytic after burner, exhaust gases will flow rearwardly through the exhaust pipe 10 and venturi V into the front portion of the housing H. As these gases pass through the venturi V they will produce sub-atmospheric pressures at the throat 36 of the venturi. Since this throat is in communication with the inlet tube 22, fresh air will thereby be aspirated into the front portion of the housing H through the pre-heater jack 39. It should be especially noted that such fresh air will be heated as it passes through the annulus defined between the housing H and the pre-heater jacket 39, the side walls 16 of the housing H existing at a comparatively high temperature during operation of the afterburner.

The exhaust gases entering the front of the housing H contain a certain percentage of unburned constituents. These unburned constituents consist primarily of hydrocarbons, acetylene, aldehydes, carbon monoxide, and the like, which, if released, serve to contaminate the atmosphere. When the exhaust gases, together with the heated fresh air from the inlet tube 22, pass through the housing H, the catalyst rods C induce further oxidation or burning so as to transform substantially all of the unburned constituents of the exhaust gases into harmless compounds.

It has been determined that the correct percentage of fresh air to exhaust gases should be admitted to the afterburner in order to control the air/fuel ratio for optimum oxidation or burning. With particular reference to Figure 3, during idling of the engine the volume and velocity of exhaust gases being emitted therefrom is comparatively low. Hence, it is only necessary that a comparatively small volume of fresh air be drawn into the housing H in order that complete oxidation or burning of the exhaust gases may be effected. Accordingly, the control valve 25 will be disposed in its most fully closed position during idling conditions of the engine. As shown in Figure 3, the intake manifold vacuum will draw the lower end of the metallic bellows 60 upwardly to the extent indicated in this figure and the control valve 25 will be maintained in the nearly-closed position designated "idle" in this figure.

During acceleration of the engine more fresh air is required to effect complete oxidation or burning than during idling conditions, inasmuch as the volume and the velocity with which the exhaust gases pass through the housing H is at a maximum. Accordingly, referring again to Figure 3, it will be seen that the control valve 25 will be maintained in its most fully opened position, designated "acceleration" in this figure. The control valve 25 will be urged to this position upon downward movement of the free end of the bellows 60 because of the lower value of intake manifold vacuum during acceleration conditions as compared with idling conditions. With the control valve 25 disposed in its most open position, a maximum amount of heated fresh air may enter the front of the housing H and as a result, substantially complete oxidation or burning of the exhaust gases may thereby be obtained.

During deceleration conditions of the engine, the concentration of contaminants in the exhaust gases are higher than during idling or accelerating conditions, however, the volume and velocity with which these gases pass through the housing H will be lower than during acceleration or cruising conditions. Accordingly, it is not necessary to admit as much heated fresh air as during acceleration conditions. Referring to Figure 3, during deceleration the control valve 25 will be maintained in the position, designated "deceleration," the lower end of the metallic bellows 60 being raised to its highest point under the influence of the extremely high intake manifold vacuum conditions. Thus, again the proper air/fuel ratio will be obtained within the housing for effecting substantially complete oxidation or burning of the exhaust gases passing therethrough.

As noted previously hereinbefore, the catalyst rods C tend to become coated with carbon, lead and other foreign materials contained in the exhaust gases after a relatively short period of engine operation. In order to constantly maintain the surfaces of the catalyst rods C clean, the present invention contemplates that the brushes 24 be continually urged over the surfaces of the catalyst rods C during operation of the engine. This is accomplished by the rotation of the blades 68 under the influence of the exhaust gases passing through the housing H. Thus, during operation of the engine the exhaust gases issuing therefrom flowing through the housing H will effect continual rotation of the blades 68 so as to cause the brushes 24 to scrape the surfaces of the catalyst rods C clean of the foreign materials which tend to collect thereupon. It will be apparent that the brushes 24 should be formed of a heat-resistant material.

Upon extremely unfavorable operating conditions tending to effect quick coating of the catalyst rods C with foreign materials, the surfaces of these rods may be chemically scrubbed by means of the oxygen contained within the fluid tank 28. It is only necessary for the operator to open the valve 82 and permit a desired quantity of oxygen to enter the flash steam tank 26. This will preferably be accomplished while the engine is in operation and the side wall 18 of the housing H exists at a high temperature. Upon entering the flash steam tank 26, the oxygen will immediately be heated so as to expand into the front portion of the housing H through the transfer conduit 83. When the heated oxygen comes into contact with the catalyst rods C, it will effect the rapid expansion thereof. The carbon or other hardened impurities found on the surfaces of the catalyst rods C will then break away from the surface of the rods so as to leave their surfaces clean. Of course, various fluids other than oxygen may be employed for this chemical scrubbing operation.

Various other modifications and changes may be made with respect to the foregoing detailed description without departing from the spirit of the invention or the scope of the following claims.

I claim:

1. A catalytic afterburner for purifying the exhaust gases issuing from an internal combustion engine, comprising: a housing means; a chamber in said housing for receiving said exhaust gases; a plurality of solid catalyst rods in said chamber capable of supporting hydrocarbon combustion disposed in said chamber; means for removing treated exhaust gases from said chamber; a radially extending blade rotatably mounted on a shaft within said housing in the path of said exhaust gases so as to be rotated by the flow thereof through said housing; and a brush mounted upon said blade for mechanically scrubbing the surface of said catalyst rods during operation of said engine.

2. A catalytic afterburner for purifying the exhaust gases issuing from an internal combustion engine, comprising: a housing means; a chamber in said housing for receiving said exhaust gases; means for removing treated exhaust gases from said chamber; a plurality of radially extending catalyst rods supported within said housing in said chamber; a longitudinally extending shaft mounted in said housing; a plurality of radially extending blades rotatably carried by said shaft in the path of said exhaust gases so as to be moved by the flow thereof through said housing; and a brush mounted upon said blades for mechanically scrubbing the surface of said catalyst rods during operation of said engine.

3. A catalytic afterburner for purifying the exhaust gases issuing from an internal combustion engine, comprising: a cylindrical housing having its front end in communication with the exhaust of said engine and formed with a chamber; a venturi tube interposed between the front end of said chamber and said exhaust; conduit means interconnecting the throat of said venturi with the atmosphere; a plurality of radially extending catalyst rods supported within said housing in said chamber; a longitudinally extending shaft mounted in said housing; a plurality of radially extending blades rotatably carried by said shaft in the path of said exhaust gases so as to be moved by the flow thereof through said housing; means for removing treated exhaust gases from said chamber; and a brush mounted upon each of said blades for mechanically scrubbing the surfaces of said catalyst rods during operation of said engine.

4. A catalytic afterburner for purifying the exhaust gases issuing from an internal combustion engine, comprising: a cylindrical housing having its front end in communication with the exhaust of said engine and formed with a chamber; a venturi tube interposed between the front end of said chamber and said exhaust; conduit means interconnecting the throat of said venturi with the atmosphere; control valve means in said conduit means for varying the amount of fresh air admitted to said chamber in accordance with the throttle setting of said engine; a plurality of radially extending catalyst rods supported within said housing in said chamber; a longitudinally extending shaft mounted in said housing; a plurality of radially extending blades rotatably carried by said shaft in the path of said exhaust gases so as to be moved by the flow thereof through said housing; means for removing treated exhaust gases from said chamber; and a brush mounted upon each of said blades for mechanically scrubbing the surface of said catalyst rods during operation of said engine.

5. A catalytic afterburner for purifying the exhaust gases issuing from an internal combustion engine, comprising: a housing; a chamber in said housing for receiving said exhaust gases; catalyst rod means capable of supporting hydrocarbon combustion disposed in said chamber; radially extending blade means rotatably mounted within said housing in the path of said exhaust gases so as to be rotated by the flow thereof through said housing; brush means mounted upon said blade means for mechanically scrubbing the surface of said catalyst rod means during operation of said engine; a flash steam tank mounted on said housing so as to be heated thereby; a fluid tank; conduit means interconnecting said fluid tank and said flash steam tank; means for removing treated exhaust gases from said chamber; and valve means for introducing fluid into said flash steam tank whereby said fluid will enter said chamber in a heated condition.

6. A catalytic afterburner for purifying the exhaust gases issuing from an internal combustion engine, comprising: a housing; a chamber in said housing for receiving said exhaust gases; a plurality of radially extending catalyst rods supported within said housing in said chamber; a longitudinally extending shaft mounted in said housing; a plurality of radially extending blades rotatably carried by said shaft in the path of said exhaust gases so as to be moved by the flow of air thereof through said housing; brush means mounted upon each of said blades for mechanically scrubbing the surface of said catalyst rods during operation of said engine; a flash steam tank mounted on said housing so as to be heated thereby; a fluid tank; means for removing treated exhaust gases from said chamber; conduit means interconnecting said fluid tank and said flash steam tank; and valve means for introducing fluid into said flash steam tank whereby said fluid will enter said chamber in a heated condition.

References Cited in the file of this patent

UNITED STATES PATENTS

| Number | Name | Date |
|---|---|---|
| 1,179,145 | Southern | Apr. 11, 1916 |
| 1,985,713 | Bartlett | Dec. 25, 1934 |
| 2,004,865 | Grison | June 11, 1935 |
| 2,038,313 | Placko | Apr. 21, 1936 |
| 2,747,976 | Houdry | May 29, 1956 |

FOREIGN PATENTS

| 411,655 | Great Britain | June 14, 1934 |